(12) United States Patent (10) Patent No.: US 8,306,860 B2
Dunsmore et al. (45) Date of Patent: Nov. 6, 2012

(54) PAY AT THE TABLE SYSTEM

(75) Inventors: Rodney Charles Dunsmore, Austin, TX (US); Steven Lee Harrington, Austin, TX (US); Mark Christan Speich, Cedar Park, TX (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 517 days.

(21) Appl. No.: 12/259,868

(22) Filed: Oct. 28, 2008

(65) Prior Publication Data

US 2009/0055276 A1 Feb. 26, 2009

Related U.S. Application Data

(62) Division of application No. 09/679,781, filed on Oct. 5, 2000, now Pat. No. 7,457,767.

(51) Int. Cl.
G06Q 30/00 (2012.01)
G06Q 50/00 (2012.01)
G06Q 20/00 (2012.01)

(52) U.S. Cl. ................ 705/15; 705/16; 705/17

(58) Field of Classification Search ............ 705/15, 705/16, 17
See application file for complete search history.

(56) References Cited

U.S. PATENT DOCUMENTS

| 4,396,985 | A |   | 8/1983  | Ohara |          |
|-----------|---|---|---------|-------|----------|
| 4,530,067 | A | * | 7/1985  | Dorr  | 705/15   |
| 5,262,938 | A | * | 11/1993 | Rapoport et al. | 705/15 |
| 5,355,115 | A |   | 10/1994 | Goor et al. |   |
| 5,649,117 | A | * | 7/1997  | Landry | 705/40  |
| 5,838,798 | A | * | 11/1998 | Stevens, III | 705/21 |
| 5,839,115 | A | * | 11/1998 | Coleman | 705/15 |
| 5,845,263 | A | * | 12/1998 | Camaisa et al. | 705/15 |
| 5,903,881 | A | * | 5/1999  | Schrader et al. | 705/42 |
| 5,933,812 | A | * | 8/1999  | Meyer et al. | 705/15 |
| 5,979,604 | A |   | 11/1999 | Pinna et al. |   |
| 6,076,079 | A | * | 6/2000  | Boston et al. | 705/400 |
| 6,088,681 | A |   | 7/2000  | Coleman et al. |   |

(Continued)

FOREIGN PATENT DOCUMENTS

WO 9504979 A1 2/1995

OTHER PUBLICATIONS

McCabe, D (Sep. 1999). Money Q&A beware of dangers linked to co-signing. Orange County Register, p. k.03 (hereinafter "NPL1").*

(Continued)

*Primary Examiner* — Elaine Gort
*Assistant Examiner* — Peter L Ludwig
(74) *Attorney, Agent, or Firm* — Yee & Associates, P.C.

(57) ABSTRACT

Patrons at a restaurant or bar can pay at their table using credit cards, without involving the restaurant or bar cashier and/or wait staff. Patrons are assisted using this system in dividing the bill by displaying the amount due (including tax) and allowing each patron to enter the amount they wish to pay. When the initial bill is presented, a balance due will be displayed and the indication will be provided that the bill has yet to be paid in full. As each transaction is entered, a running total will be displayed indicating the remaining balance due. When the running total reaches zero, the bill is paid in full, and an indication will be provided, such as by illuminating a green indicator light or by displaying a balance due of $0.00.

27 Claims, 6 Drawing Sheets

U.S. PATENT DOCUMENTS

| | | | |
|---|---|---|---|
| 6,412,691 B1* | 7/2002 | Shiobara et al. | 235/380 |
| 6,502,756 B1 | 1/2003 | Fahraeus | |
| 6,976,075 B2 | 12/2005 | Ma | |
| 7,457,767 B1 | 11/2008 | Dunsmore et al. | |
| 2002/0023055 A1* | 2/2002 | Antognini et al. | 705/40 |
| 2002/0073234 A1 | 6/2002 | Ma | |
| 2002/0087478 A1 | 7/2002 | Hudd et al. | |
| 2009/0055280 A1 | 2/2009 | Dunsmore et al. | |

OTHER PUBLICATIONS

McCabe, D (Sep. 1999). Money Q&A beware of dangers linked to co-signing. Orange County Register, p. k.03.*

Ainsworth et al., "Introduction to Accounting: An Integrated Approach", Michael W. Junior, 1997, pp. 1-3.

Office Action regarding U.S. Appl. No. 09/679,781, dated Jun. 3, 2003, 8 pages.

Response to Office Action regarding U.S. Appl. No. 09/679,781, dated Oct. 6, 2003, 19 pages.

Final Office Action regarding U.S. Appl. No. 09/679,781, dated Dec. 10, 2003, 8 pages.

Appeal Brief regarding U.S. Appl. No. 09/679,781, dated May 6, 2004, 17 pages.

Appeal Brief regarding U.S. Appl. No. 09/679,781, dated Oct. 25, 2004, 19 pages.

Examiner's Answer regarding U.S. Appl. No. 09/679,781, dated Feb. 17, 2005, 13 pages.

Decision on Appeal regarding U.S. Appl. No. 09/679,781, dated Jun. 16, 2008, 9 pages.

Notice of Allowance regarding U.S. Appl. No. 09/679,781, dated Jul. 18, 2008, 6 pages.

Office Action regarding U.S. Appl. No. 12/259,952, dated Apr. 21, 2011, 15 pages.

Response to Office Action regarding U.S. Appl. No. 12/259,952, dated Jul. 12, 2011, 13 pages.

Final Office Action regarding U.S. Appl. No. 12/259,952, dated Sep. 2, 2011, 18 pages.

Amendment Pursuant to Request for Continued Examination regarding U.S. Appl. No. 12/259,952, dated Dec. 2, 2011, 15 pages.

Office Action regarding U.S. Appl. No. 12/259,952, dated Apr. 13, 2012, 20 pages.

Response to Office Action regarding U.S. Appl. No. 12/259,952, dated Jun. 13, 2012, 26 pages.

* cited by examiner

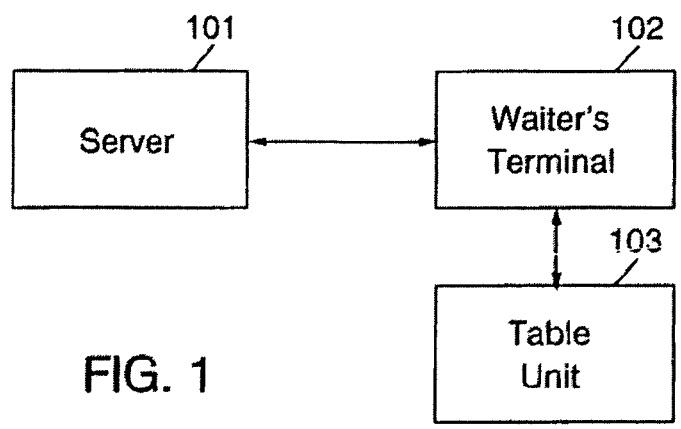
FIG. 1
FIG. 2
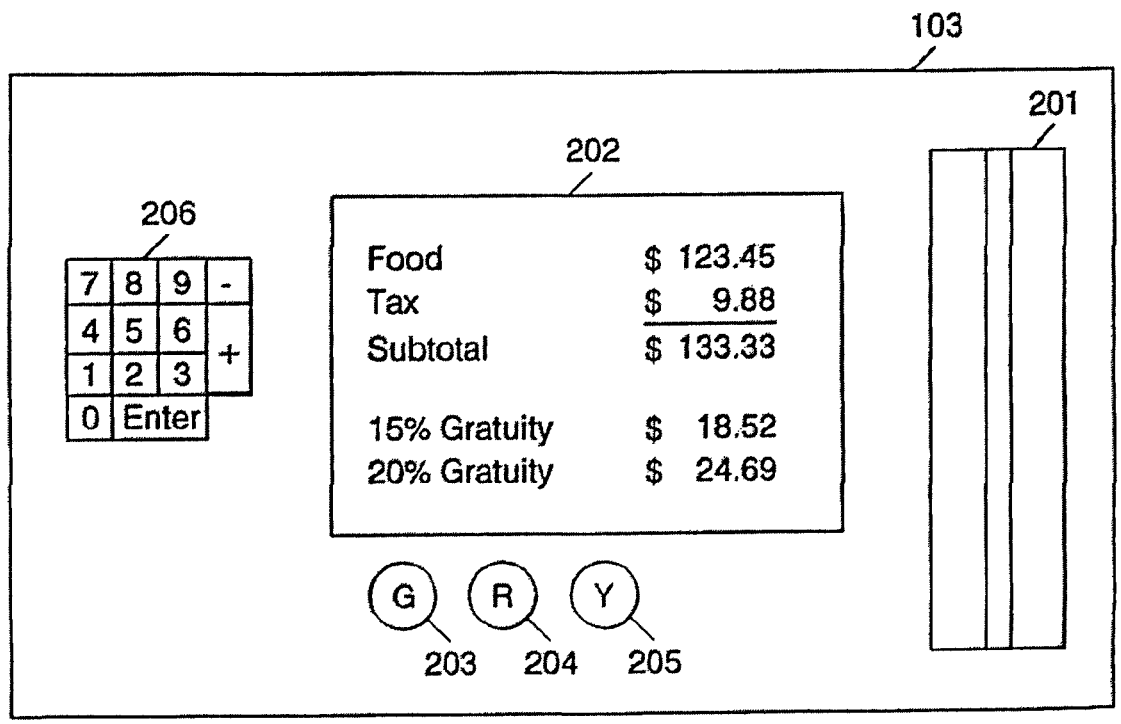

FIG. 6

| | | |
|---|---|---|
| #1 Plate | $ | 6.95 |
| #4 Dinner | $ | 9.50 |
| Tea | $ | 1.20 |
| Coffee | $ | 1.20 |
| Subtotal | $ | 18.85 |
| Tax (8.25%) | $ | 1.56 |
| Total | $ | 20.41 |

15% Gratuity

20% Gratuity

ENTER

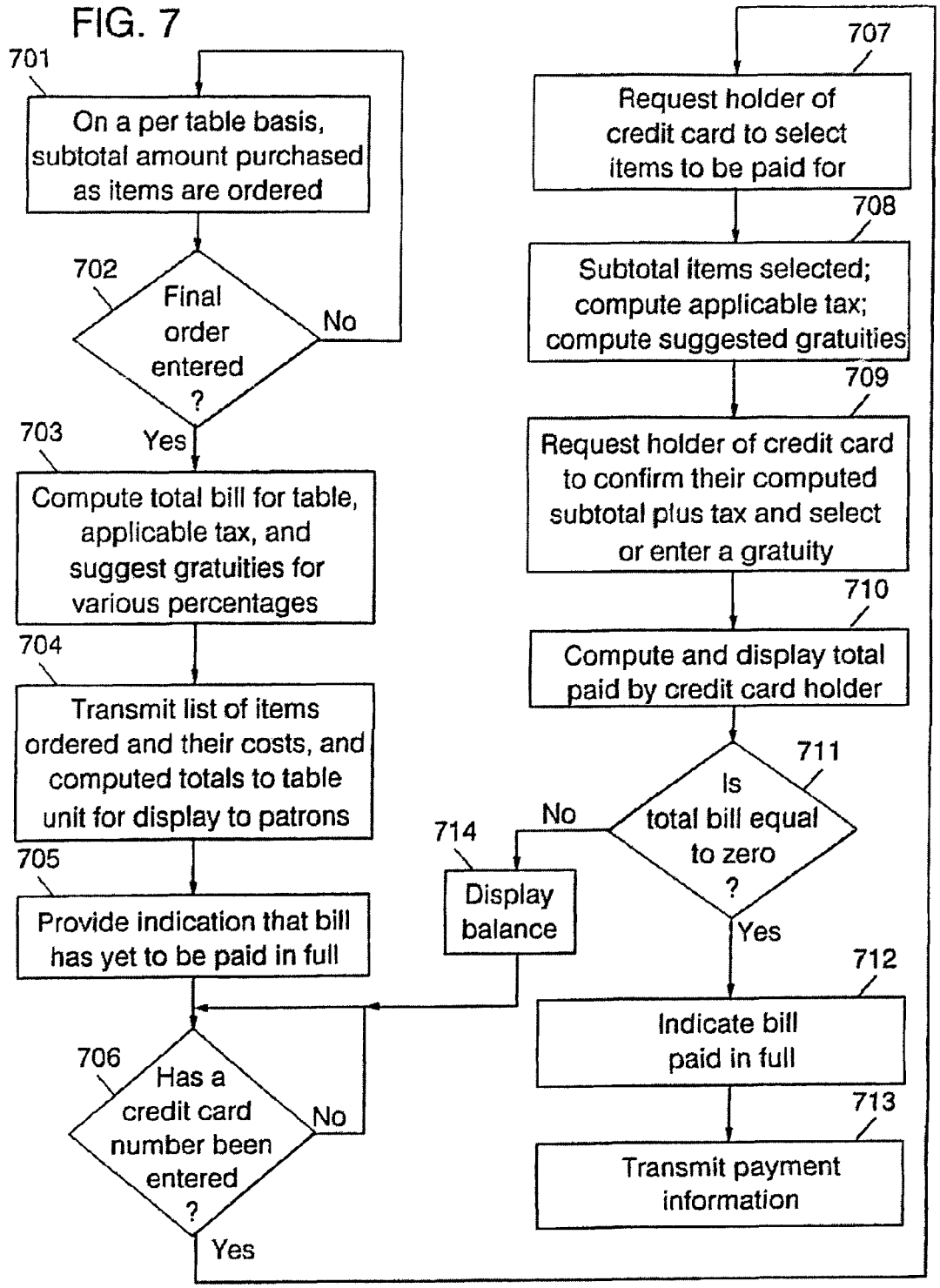

PAY AT THE TABLE SYSTEM

This application is a division of application Ser. No. 09/679,781, filed Oct. 5, 2000, status allowed.

TECHNICAL FIELD

The present invention relates in general to information processing systems, and in particular, to a point-of-sale terminal permitting restaurant patrons to individually pay their portion of the restaurant bill.

BACKGROUND INFORMATION

Many times has the following scenario been encountered. A group of patrons dining at a restaurant receive the bill, and then go through the complicated task of determining how much each patron owes on the bill including applicable tax and an allotted portion of the gratuity to be paid to the wait staff. Moreover, many restaurants and bars do not accept separate payments for items on a single bill mostly because splitting a bill often results in errors and in taking time away from the wait staff being able to serve other customers within the restaurant.

Thus, there is a need to address these competing interests, whereby the patrons are able to split a bill without such a process unduly burdening the wait staff, and adversely impacting the restaurant's efficiency.

U.S. Pat. No. 5,933,812 to Meyer, et al provides a portable transaction terminal system which provides for complete data entry at the guest table of an eating and drinking establishment. The terminal has the facility for entering all the information needed to complete the transaction, including the server's gratuity. This portable transaction terminal system is nothing more than the credit card payment devices found at almost every commercial establishment, such as grocery stores, permitting a total bill to be paid using a patron's credit card. Meyer, et al. provides an additional functionality in permitting the patron to pay a gratuity in addition to the total bill. What Meyer, et al. does not disclose is an ability for the bill to be split among the various patrons at a table and for each of such patrons to individually pay their desired portion using a credit card.

SUMMARY OF THE INVENTION

The foregoing need is addressed by the present invention which allows diners in a restaurant to pay at the table using credit cards, without involving the restaurant cashier and/or the wait staff. The present invention will assist patrons in dividing the bill by displaying the amount due (including tax) and allowing each patron to enter the amount which he or she wishes to pay. When the initial bill is presented, a balance due will be displayed and a red indicator light may be illuminated, indicating that the bill is not yet paid in full. As each transaction is entered, a running total will be displayed indicating the remaining balance due. When the running total reaches zero, the bill is paid in full (including the tax, but not necessarily an optional gratuity). The present invention may indicate that the bill has been paid in full by illuminating a green indicator light and by displaying a balance due of $0.00.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates a network implementing the present invention;

FIG. 2 illustrates a point-of-sale terminal for allowing patrons to pay their portion of the bill using a credit;

FIG. 6 illustrates an alternative point-of-sale terminal for permitting patrons to pay their portion of the bill using a credit card at a touch-sensitive display screen; and FIG. 7 illustrates a flow diagram of another alternative embodiment of the present invention.

DETAILED DESCRIPTION

Figure 3:
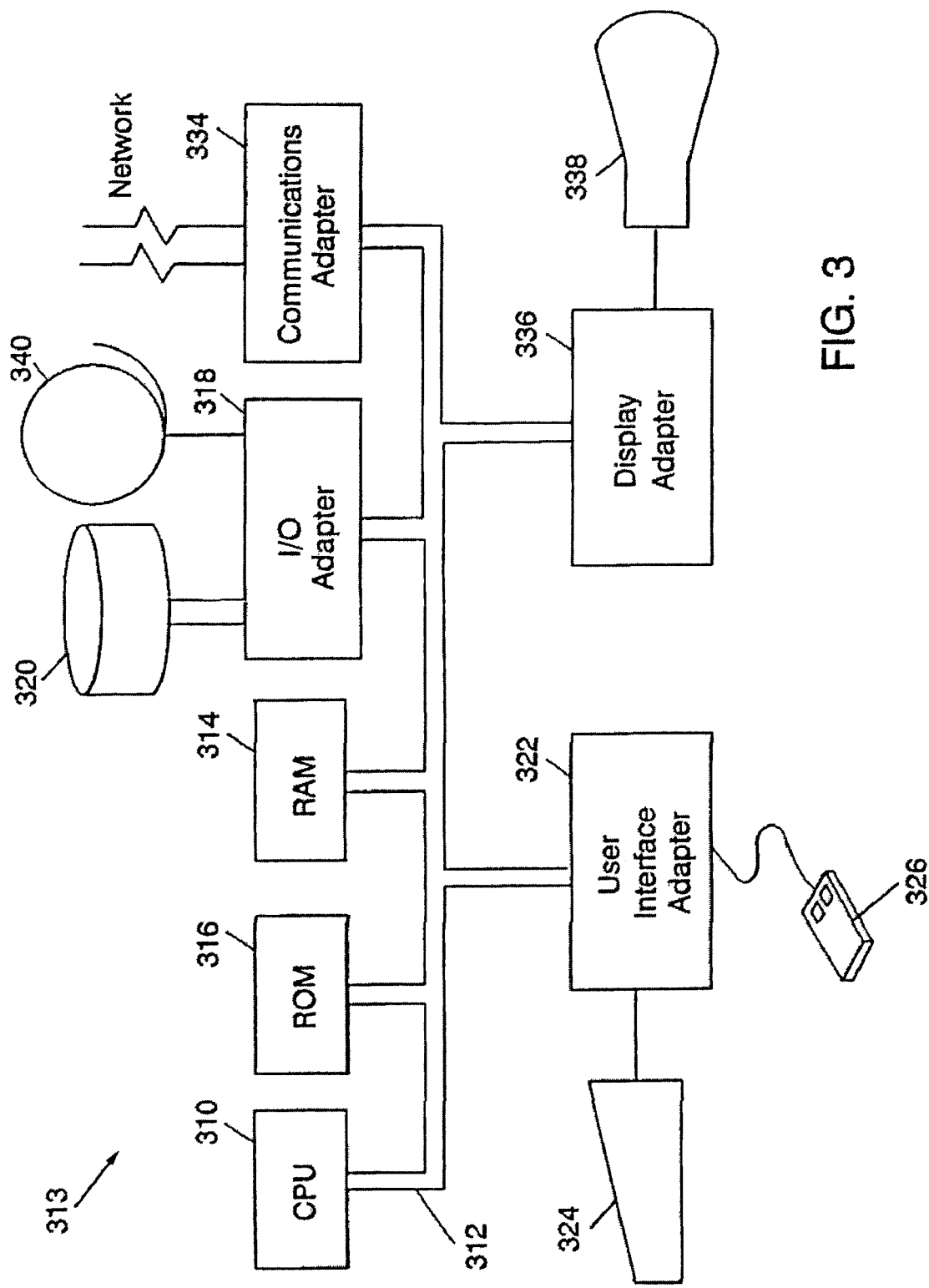
FIG. 3 illustrates a block diagram of a data processing system configurable in accordance with the present invention.

In the following description, numerous specific details are set forth such as specific point of sale terminal configurations, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The following exemplified scenario is addressed to the use of the present invention. A group of patrons are dining at a restaurant, where each of the patrons orders various items, which are placed on a single bill by the wait staff. The total bill is then presented to the table of patrons, who decide that they wish to split the bill and pay on a separate basis. The present invention has the advantage of permitting this process of paying separately without unduly burdening the restaurant wait staff.

Note, though the present invention is described with respect to a restaurant, it is applicable to any situation where a plurality of patrons wish to pay separate portions of a bill.

Referring to FIG. 1, in today's typical restaurant environment, the old fashioned cash register has been replaced by a computer server 101, which is coupled to a waiter's or cashier's terminal 102 where orders from various patrons at tables are entered into the system on a per table basis. The server 101 keeps track of such orders, and may provide various other functionalities not pertinent to the present invention, such as being linked to a software accounting system. As a waiter receives orders for items of food and beverages from patrons at a particular table, the waiter will input such items at the waiter's terminal 102, which then keeps track of a running total bill for each table within the restaurant establishment. For example, once the patrons at a particular table have completed their main course, the waiter will ask the patrons if they wish to now order desert and/or coffee. If any orders of desert and/or coffee are made by any of the patrons, the waiter will enter such orders at the waiter's terminal 102, and such items will be added to the total bill for that table.

The typical method for presenting the total bill for patrons at a table is for the waiter to print out the total bill at the waiter's terminal 102 and present the paper invoice to the patrons at the table. The reason there is typically a single bill presented to the patrons is that most restaurants do not permit separate checks to be issued to the various patrons at a table since this not only complicates an already complicated job for the waiter, but can also result in more errors being made by the waiter in keeping track of each of the patron's individual orders, and slows down each waiter's efficiency in being able to provide personal service to each of their respective tables. These inefficiencies can further result in human errors being made by the wait staff in bringing incorrect meal orders to the patrons at their tables, and can also slow down the throughput of patrons through the restaurant where it takes longer for a table of patrons to be served and the payment transaction to be completed so that the table can be cleared for the next group of patrons.

Though U.S. Pat. No. 5,933,812 to Meyer, et al. discussed previously provides for an entire table of patrons to pay the total bill using a credit card, including the gratuity, it does not provide an ability for the check to be split among the various patrons, and for those individual patrons to then pay their desired portion of the bill. This deficiency is addressed by the present invention.

Again referring to FIG. 1, the present invention provides a table unit 103, which is either brought by the waiter to the table with the presentation of the total bill, or is permanently resident at the table. Nevertheless, the table unit 103 is in communication with the waiter's terminal 102 and the server 101 so that the total bill can be displayed to the patrons at the table and for permitting the patrons to individually pay what they desire their portion of the bill to be.

Referring to FIG. 2, there is illustrated one example of such a table unit 103, which includes a credit card reader 201 through which a credit card (not shown) can be slid through for reading the account information on the magnetic strip of the credit card, in a manner that is well known in the art. Table unit 103 also includes a display 202, which will display information pertaining to the food bill for the table of patrons, in a manner as further described below. Also illustrated in FIG. 2 are green light 203, red light 204, and yellow light 205, which are also further discussed below.

Figure 4:
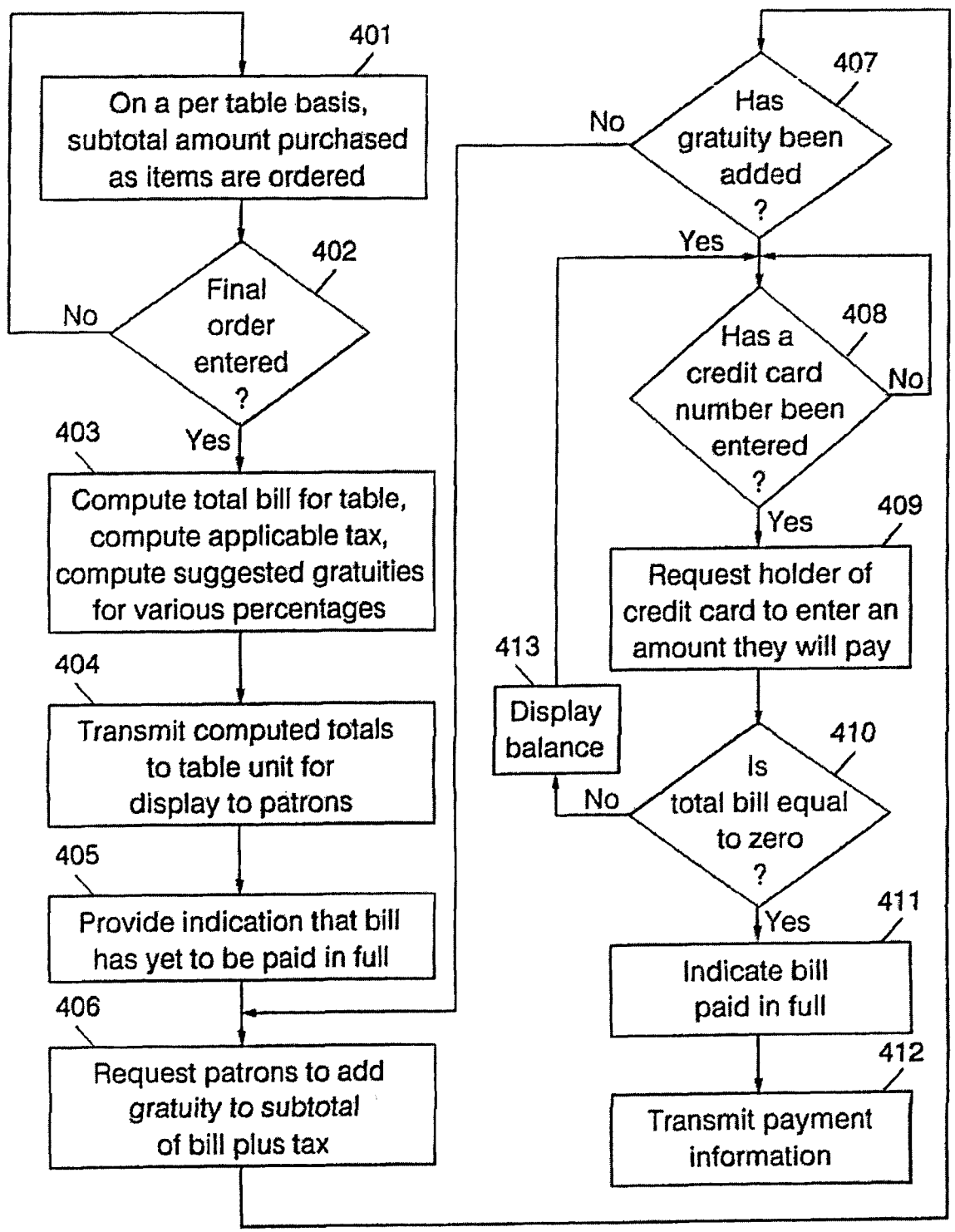
FIG. 4 illustrates a flow diagram of one embodiment of the present invention.

As discussed previously, a waiter serving a particular table of patrons will enter in each item ordered by the patrons at the table at the waiter's terminal 102. The system illustrated in FIG. 1 will keep track of the itemized list of items ordered by the table of patrons, including a running subtotal indicating the total amount owed by the table of patrons for the items they ordered. Referring to FIG. 4, step 401 shows that on a per table basis, such a subtotal amount of items purchased is maintained at the waiter's terminal 102. When the waiter for the table of patrons has determined that the patrons are no longer going to order any further items, then the waiter can provide some type of input at the waiter's terminal 102 that the final order has been entered (step 402). In step 403, the system will compute the total bill for the table of patrons, compute any applicable tax to be charged along with the total bill, and can optionally compute suggested gratuities to be paid by the patrons at the table for various suggested percentages. For example, gratuities can be calculated based on a 15% factor, a 20% factor, etc. In step 404, the computed totals are then transmitted from the waiter's terminal 102 to the table unit 103 for display to the patrons on display 202 on unit 103. As an example, a total food bill of $123.45, along with the applicable tax for the bill of $9.88 with a resulting subtotal of $133.33 may be displayed on display 202. Furthermore, the suggested gratuities of 15% ($18.52) and 20% ($24.69) may also be displayed on display 202.

Next, in step 405, an indication can be provided to either the waiter at waiter's terminal 102 or the patrons at table unit 103 that the bill has yet to be paid in full by the patrons. One example of such an indication would be the illumination of an LED light 204 on unit 103. Another indication might be merely some wording displayed on display 202 stating that the bill has yet to be paid in full. This indication also provides the same type of information to the wait staff as to whether the patrons have completed the payment transaction. Next, in step 406, a request is made to the patrons to add their desired gratuity submission to the subtotal of the bill plus the tax. Such a request can be performed in the manner of a message displayed on display 202. The patrons can then enter in any amount of gratuity they wish, including selecting one of the suggested gratuity amounts. The entry of such an amount can be performed using numerical key pad 206. Alternatively, display screen 202 may be a touch-sensitive screen, which are well known in the art. The result is that a grand total of food, tax, and gratuity will then be displayed for payment by the patrons. In step 407, the system determines whether the gratuity has been added. If not, the process merely returns to step 406. However, if the gratuity has been then added by the patrons, the process proceeds to step 408 to determine whether one of the patrons has entered a credit card number. This can be performed by a patron swiping their credit card (not shown) through credit card reader 201, or an option can be implemented whereby the credit card number of a patron is entered using the input keypad 206. The system will merely loop upon itself if a credit card number has yet to be entered. Note, while the system merely loops upon itself waiting for a patron to enter a credit card number or to swipe their credit card through credit card reader 201, the indication provided in step 405 visually remains. For example, the red light 204 will remain illuminated. In step 409, if a patron has swiped their credit card through credit card reader 201, the system, in step 409, will request the holder of that credit card to enter an amount they wish to pay using that credit card number. Such a request can be displayed to the patron using display 202. The patron associated with that credit card number can then enter in an amount they are paying on that credit card using the input keypad 206. In step 410, the system will deduct the amount entered by the patron from the grand total bill, and determine if the amount entered by the patron results in a payment of the entire bill or merely a portion thereof. If the amount entered by the patron associated with the credit card swiped through credit card reader 201 is less than the total bill, then in step 413, the remaining balance still owed by the table of patrons will be displayed on display 202. The system will then wait for another credit card number to be entered in step 408. Theoretically, such a credit card number can be the same credit card number as entered previously where the same patron decides that they are going to pay the next portion of the balance. However, what the first portion of the invention is designed for is to enable another one of the patrons within the group at the table to then enter in their own credit card by swiping it through credit card reader 201 and then enter in an amount they wish to pay on the remaining balance in step 409. Again, in step 410, this new amount entered by the subsequent patron is then subtracted from the remaining balance to determine if the total bill has now been paid at the table. If a balance still remains, the process continues through steps 413, 408, 409 and 410 and so on until the total bill is paid of the food, tax, and selected gratuity. Once the total bill is computed to have been paid by the group of patrons at the table, in step 411, an indication will be provided that the bill has now been paid in full. This may be shown by the discontinuance of the illumination of the red lamp 204, and the illumination of a green lamp 203 on the unit 103. Furthermore, some other type of indication may be provided at the waiter's terminal 102 to indicate that the patrons have now paid the bill in full. Thereafter, in step 412, the payment information entered by each of the patrons with respect to their credit card numbers and accounts, will then be transmitted by the establishment from server 101 over a network to the various financial institutions associated with the credit card accounts of the patrons.

Figure 5:
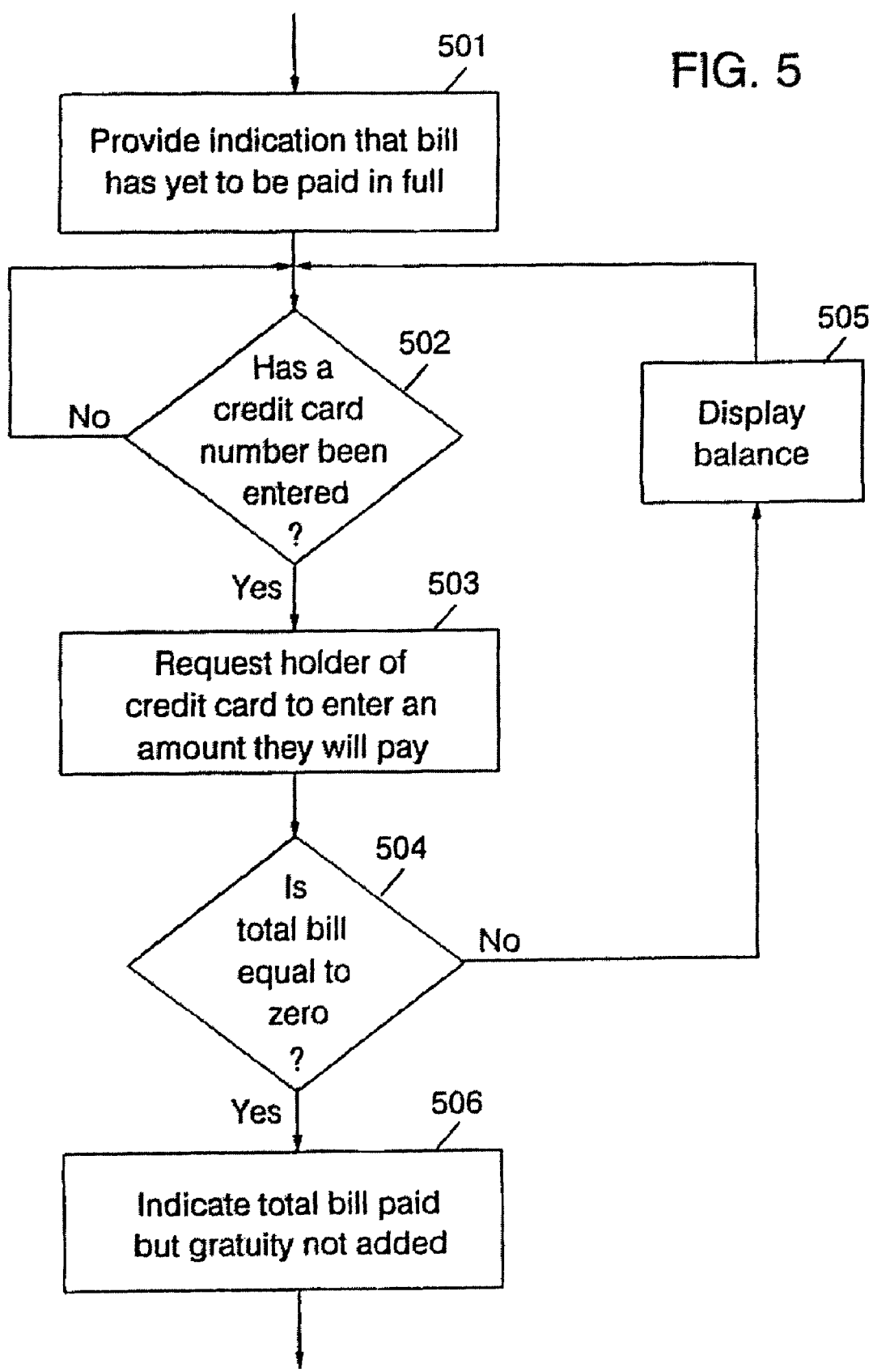
FIG. 5 illustrates a flow diagram of an alternative embodiment of the present invention.

Referring to FIG. 5, there is illustrated an alternative embodiment of the present invention, which can be used to replace steps 405-413 in FIG. 4. Essentially, these steps may be implemented to permit each of the patrons to pay a portion of the total food bill plus tax, but not the gratuity. From step 404, the process will proceed to step 501 to provide an indication that the bill has yet to be paid in full. This step may be performed in a manner similarly as discussed above with respect to step 405. Thereafter, steps 502-505 can be implemented in a manner as similarly described above with respect to steps 408-410 and 413 whereby each of the patrons at the table pays their desired portion of the food bill plus tax portion. Once that total portion has been paid in full the process will then proceed to step 506 to indicate that the total bill has been paid, but that a gratuity has yet to be added. This indication can be implemented using a displayed message or by illuminating a yellow lamp 205 on unit 103. Thereafter, the patrons can then decide what amount of gratuity they wish to pay to the wait staff, which can be performed using cash collected from each of the patrons to be deposited on the table, or by repeating the process described above with respect to steps 502-505 for a gratuity amount to be selected and agreed upon by the patrons.

Referring to FIG. 6, there is illustrated an alternative embodiment of the present invention whereby a table unit 601 is implemented with a touch-sensitive display screen 603, and a credit card reader 602. The credit card reader 602 functions in a manner as similarly described above with respect to the credit card reader 201 in unit 103. However, the display 202 and the key input pad 206 are replaced by the touch-sensitive display screen 603. The touch-sensitive screen 603 operates in a manner well known in the art whereby a user can touch various items displayed on the screen for selection of those items. What table unit 601 enables the system to do is to list every item ordered by the table of patrons on touch-sensitive display screen 603, whereby each of the patrons can then select the items they wish to pay for, and enter a gratuity they wish to pay for on each of their individual credit cards.

Referring to FIG. 7, in step 701, on a per table basis, a subtotal amount is calculated for the items ordered and purchased by a table of patrons. Steps 702 and 703 are then performed in a manner as similarly described above with respect to steps 402 and 403. Thereafter, in step 704, the list of items ordered by the patrons at the table and their respective costs are then displayed on touch-sensitive display 603. Additionally, the subtotal for the food items will be displayed along with any applicable tax, resulting in a total displayed for the food and tax. Additionally, suggested gratuity amounts may also be displayed. An example of such a display of information is illustrated in FIG. 6. Thereafter, in step 705, an indication will be provided that the bill has yet to be paid in full. FIG. 6 does not illustrate the red, green and yellow lamps as shown in FIG. 2, but these can be implemented on unit 601 as well. In step 706, the system loops until a credit card number has been entered by a patron, either using the touch-sensitive screen 603 to enter in digits on a displayed virtual numeric keypad (not shown), or by swiping a credit card through credit card reader 602. Once a patron has entered a credit card number, the process proceeds to step 707 where a request is made of the credit card holder to select items the credit card holder wishes to pay for. Such a request can be made using a message displayed on display 603. The credit card holder will then select items they wish to pay for using the touch-sensitive screen, in a manner well known in the art. For example, referring to the exemplary list of items shown in FIG. 6, this credit card holder could select to pay for the #1 Plate and for the Coffee by touching those items on the touch-sensitive screen 603. In step 708, as each item is selected by the credit card holder, a subtotal of such items is maintained, and will be displayed to the credit card holder in response to some type of action, such as pressing a virtual ENTER button on display 603. Along with the subtotal of items selected by the credit card holder, the system will also compute and display the tax associated with such items, and may also compute suggested gratuity amounts for the credit card holder. For example, for the subtotal of items and tax selected by the first credit card holder, suggested 15% and 20% gratuity amounts can also be displayed for selection by the credit card holder. In step 709, the holder of the credit card will then be requested to confirm their computed subtotal plus tax, and to select one of the suggested gratuity amounts, or to enter a different gratuity amount using the virtual numeric key pad, which can also be displayed. In step 710, the grand total for that particular credit card holder will then be computed and displayed, and in step 711, that amount will be subtracted from the total amount of the bill to determine if the total amount of the bill has now been paid. If not, in step 714, the remaining balance will be displayed and the process will return to step 706 to repeat steps 706-711 until the entire total bill for the food and tax have been paid by the patrons responsible for this bill. Once the total bill has been paid, the process will proceed from step 711 to step 712 to indicate that the bill has been paid in full, and the payment information for the various credit card holders who entered their information will be transmitted to the respective financial institutions in step 713.

The various units illustrated in FIG. 1 can each be implemented using a typical data processing system, such as the one illustrated in FIG. 3.

Referring first to FIG. 3, an example is shown of a data processing system 300 which may be used for the invention. The system has a central processing unit (CPU) 310, which is coupled to various other components by system bus 312. Read only memory ("ROM") 316 is coupled to the system bus 312 and includes a basic input/output system ("BIOS") that controls certain basic functions of the data processing system 300. Random access memory ("RAM") 314, I/O adapter 318, and communications adapter 334 are also coupled to the system bus 312. I/O adapter 318 may be a small computer system interface ("SCSI") adapter that communicates with a disk storage device 320. Communications adapter 334 interconnects bus 312 with an outside network enabling the data processing system to communicate with other such systems. Input/Output devices are also connected to system bus 312 via user interface adapter 322 and display adapter 336. Keyboard 324 and mouse 326 are all interconnected to bus 312 via user interface adapter 322. Display monitor 338 is connected to system bus 312 by display adapter 336. In this manner, a user is capable of inputting to the system throughout the keyboard 324 or mouse 326 and receiving output from the system display 338.

Preferred implementations of the invention include implementations as a computer system programmed to execute the method or methods described herein, and as a computer program product. According to the computer system implementation, sets of instructions for executing the method or methods are resident in the random access memory 314 of one or more computer systems configured generally as described above. Until required by the computer system, the set of instructions may be stored as a computer program product in another computer memory, for example, in disk drive 320 (which may include a removable memory such as an optical disk or floppy disk for eventual use in the disk drive 320). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological or some other physical change. While it is convenient to describe the invention in terms of instructions, symbols, characters, or the like, the reader should remember that all of these and similar terms should be associated with the appropriate physical elements.

Note that the invention may describe terms such as comparing, validating selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Although the present invention and its advantages have been described in detail, it should be understood that various changes, substitutions and alterations can be made herein without departing from the spirit and scope of the invention as defined by the appended claims.

What is claimed is:

1. A method for payment of a bill, the method comprising steps of:
   a) calculating, using a processing unit, a total bill for a plurality of patrons at a table;
   b) displaying, on a display of a table unit device physically located at the table configured to enable patrons seated at the table to manually enter an electronic payment of the total bill to the plurality of patrons at the table;
   c) receiving, after providing physical access at the table to the table unit device by a first of the plurality of patrons, manual input information at the table unit device directly from the first one of the plurality of patrons on the table unit device at the table to pay a first portion of the total bill using a first credit card account;
   d) automatically calculating, using the processing unit, in response to receiving the input information directly from the first one of the plurality of patrons, a first balance owed equal to the total bill minus the first portion;
   e) automatically displaying, on the display of the table unit device, in response to automatically calculating the balance owed, the balance owed to the plurality of patrons;
   f) receiving, on the table unit device at the table responsive to providing physical access at the table to the table unit device by a second of the plurality of patrons, manual input information at the table unit device directly from the second of the plurality of patrons on the table unit device at the table to pay a second portion of the total bill using a second credit card account;
   g) automatically calculating, in response to receiving the input information directly from the second of the plurality of patrons, a balance owed equal to the balance owed on the total bill minus the second portion, and retaining this balance owed as a second balance owed on the total bill, the second balance equaling a total amount owed by the plurality of patrons;
   h) automatically causing the display, on the display of the table unit device, in response to automatically calculating the balance owed, to display the second balance owed to the plurality of patrons; and
   i) repeating the steps f) through h) until the total amount owed equals zero.

2. The method as recited in claim 1, wherein the total bill represents a total amount of money owed by the plurality of patrons for items selected for purchase by the plurality of patrons.

3. The method as recited in claim 1, wherein step c) further comprises:
   receiving credit card account information associated with the first credit card account;
   receiving the first portion manually inputted by the first one of the plurality of patrons; and
   wherein step f) further comprises:
   receiving credit card account information associated with the second credit card account; and
   receiving the second portion manually inputted by the second one of the plurality of patrons.

4. The method as recited in claim 1, wherein the receipt of credit card information further comprises reading a magnetic strip on a credit card when it is swiped through a credit card reader.

5. The method as recited in claim 1, further comprising:
   transmitting the manual input information received in steps c) and f) to one or more financial institutions.

6. The method as recited in claim 1, further comprising:
   requesting the first one of the plurality of patrons to include a first gratuity amount with the first input information, wherein the first portion includes the first gratuity amount; and
   requesting each subsequent ones of the plurality of patrons to include a gratuity amount with the input information, wherein each subsequent portion includes the gratuity amount.

7. The method as recited in claim 6, further comprising:
   requesting the plurality of patrons add an amount of gratuity to the total bill before step c) is performed.

8. The method as recited in claim 7, wherein the first and a second gratuity amounts equal to the amount of gratuity added to the total bill.

9. The method as recited in claim 1, wherein the total bill includes a gratuity selected by the plurality of patrons.

10. The method as recited in claim 1, further comprising:
    visually indicating to the plurality of patrons that the total bill has not yet been paid when the balance owed is greater than zero.

11. The method as recited in claim 10, further comprising:
    visually indicating to the plurality of patrons that the total bill has been paid when the first balance owed is equal to zero.

12. The method as recited in claim 7, wherein requesting the plurality of patrons adds the amount of gratuity to the total bill before step c) is performed comprises:
displaying to the plurality of patrons one or more suggested gratuity amounts.

13. The method as recited in claim 2, wherein step b) comprises:
displaying, on the display of the table unit device at the table, the items and a cost associated with each of the items; and
wherein step c) comprises:
receiving a manual input comprising a selection directly from the first one of the plurality of patrons of which of the items on the total bill to be included in the first portion.

14. In a restaurant, a method comprising computing a total amount owed by a plurality of patrons for items ordered by the plurality of patrons at the restaurant;
a) displaying the total amount owed on a display of a payment unit physically located at a table of the plurality of patrons, wherein the payment unit is configured to enable patrons seated at the table to manually enter an electronic payment;
b) receiving and storing first credit card information from a first credit card swiped through a credit card reader of the payment unit at the table by a first one of the plurality of patrons;
c) receiving and storing a first portion entered by the first one of the plurality of patrons into the payment unit at the table, wherein the first portion represents an amount of money to be paid by the first one of the plurality of patrons by a debit to an account of the first credit card;
d) automatically calculating, by the payment unit at the table, responsive to receiving the first portion directly from the first one of the plurality of patrons, a first balance owed on the total amount, wherein the first balance owed equals the total amount minus the first portion;
e) automatically determining, by the payment unit at the table, whether the first balance owed equals zero;
f) automatically displaying the first balance owed by the display of the payment unit at the table to the plurality of patrons;
g) responsive to a determination that the first balance owed is greater than zero, receiving and storing second credit card information from a second credit card swiped through the credit card reader of the payment unit at the table by a second one of the plurality of patrons;
h) receiving and storing a second portion manually entered directly by the second one of the plurality of patrons into the payment unit at the table, wherein the second portion represents an amount of money to be paid by the second one of the plurality of patrons by a debit to an account of the second credit card;
i) automatically calculating, by the payment unit at the table, a second balance owed on the total amount, wherein the second balance owed equals the total amount minus all the portions paid;
j) automatically determining, by the payment unit at the table, whether the second balance owed equals zero, and when the second balance owed does not equal zero, retain the value of the second balance owed as the second balance;
k) automatically displaying the second balance owed by the display of the payment unit at the table to the plurality of patrons; and
l) repeating steps g) through k) as required for subsequent ones of the plurality of patrons until a balance owed of the total amount is zero.

15. The method as recited in claim 14, further comprising:
responsive to a determination that the second balance owed is equal to zero, transmitting the first and second credit card information and payment information received by the payment unit for processing.

16. The method as recited in claim 14, wherein computing the total amount includes computing an applicable tax amount to be added as part of the total amount owed by the plurality of patrons.

17. The method as recited in claim 16, wherein the applicable tax amount is also displayed on the payment unit at the table.

18. The method as recited in claim 14, further comprising:
illuminating a light of a first color on the payment unit at the table indicating that the first balance owed is not equal to zero.

19. The method as recited in claim 18, further comprising:
illuminating a light of a second color on the payment unit at the table indicating that the first balance owed is equal to zero.

20. The method as recited in claim 14, further comprising:
computing a suggested gratuity to be paid by the plurality of patrons; and
displaying the suggested gratuity on the payment unit at the table.

21. The method as recited in claim 20, wherein the suggested gratuity is computed as a function of a percentage of the total amount, and further comprising:
displaying the percentage with the displayed suggested gratuity on the payment unit at the table.

22. The method as recited in claim 14, further comprising:
displaying a request on the payment unit at the table for the plurality of patrons to add a gratuity to the total amount.

23. The method as recited in claim 22, further comprising:
receiving a manual input directly from one of the plurality of patrons to add the gratuity to the total amount.

24. The method as recited in claim 23, wherein the first and second portions and the manual input are received through a numeric keypad on the payment unit at the table.

25. The method as recited in claim 14, wherein displaying the total amount on the payment unit at the table includes displaying a list of the items ordered and their respective costs.

26. The method as recited in claim 25, wherein the list of the items ordered and the total amount are displayed on a touch-sensitive screen on the payment unit at the table.

27. The method as recited in claim 26, wherein receiving and storing the first portion manually entered directly by the first one of the plurality of patrons into the payment unit at the table is performed by recognizing one or more touches by the first one of the plurality of patrons of a selected one or more of the items ordered displayed on the touch-sensitive screen of the payment unit at the table.

* * * * *